United States Patent
Haidar

(10) Patent No.: US 10,690,114 B1
(45) Date of Patent: Jun. 23, 2020

(54) BLADELESS WIND TURBINE

(71) Applicant: KING SAUD UNIVERSITY, Riyadh (SA)

(72) Inventor: Zeyad Abdulwahid Ghaleb Haidar, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 16/276,509

(22) Filed: Feb. 14, 2019

(51) Int. Cl.
*F03D 5/00* (2006.01)
*F03D 9/25* (2016.01)
*F03C 1/013* (2006.01)
*F03C 1/26* (2006.01)

(52) U.S. Cl.
CPC .............. *F03D 5/00* (2013.01); *F03C 1/0135* (2013.01); *F03C 1/26* (2013.01); *F03D 9/25* (2016.05); F05B 2260/406 (2013.01)

(58) Field of Classification Search
CPC ... F03D 5/005; F03D 5/04; F03D 9/28; F05B 2260/406
See application file for complete search history.

(56) References Cited

U.S. PATENT DOCUMENTS

| 122,930 | A | * | 1/1872 | Atwater | .................... | F03D 9/28 |
| | | | | | | 417/336 |
| 648,442 | A | * | 5/1900 | Scott | ........................ | F03D 3/002 |
| | | | | | | 415/4.1 |
| 4,238,171 | A | * | 12/1980 | Van Mechelen | .......... | F03D 5/04 |
| | | | | | | 415/4.1 |
| 7,504,741 | B2 | * | 3/2009 | Wrage | ....................... | F03D 5/00 |
| | | | | | | 290/55 |
| 7,626,281 | B2 | | 12/2009 | Kawai | | |
| 7,989,973 | B2 | * | 8/2011 | Birkestrand | .............. | E02B 9/00 |
| | | | | | | 290/44 |
| 8,067,878 | B1 | | 11/2011 | Lu et al. | | |
| 2011/0030361 | A1 | * | 2/2011 | Gopalswamy | ............ | F03D 5/06 |
| | | | | | | 60/398 |
| 2012/0096845 | A1 | * | 4/2012 | Ingersoll | .................. | F04B 41/02 |
| | | | | | | 60/408 |

(Continued)

FOREIGN PATENT DOCUMENTS

CN 106523288 A 3/2017
CN 106930897 A 7/2017

(Continued)

*Primary Examiner* — Thomas E Lazo
*Assistant Examiner* — Matthew Wiblin
(74) *Attorney, Agent, or Firm* — Richard C. Litman; Nathan, Goldberg & Meyer

(57) ABSTRACT

A bladeless wind turbine that creates electrical energy using hydraulically connected pistons. The system may include a disk, a small piston in fluid communication with a large piston, and a crankshaft attached to the large piston. The disk transfers forces from the wind to the small piston. Hydraulic fluid then transfers the forces to the larger piston. When the disk and associated small piston have been forced to the end of their stroke by the wind, a gate in the disk is opened to reduce wind force on the disk by allowing air to travel through the disk. Consequently, the disk and associated small piston are pushed back to the beginning of the stroke by the pressure created by the large piston's weight. This process is repeated by closing the gate in the disk. A crankshaft powering an electric generator is turned by the movement of the large piston.

5 Claims, 6 Drawing Sheets

(56) References Cited

U.S. PATENT DOCUMENTS

2013/0257049 A1* 10/2013 Taylor .................... H02P 9/006
                                                    290/43
2017/0002789 A1*  1/2017 Nair ........................ F03C 1/00
2017/0268483 A1   9/2017 Kim et al.
2018/0094617 A1*  4/2018 Neifeld ................ F03B 13/187

FOREIGN PATENT DOCUMENTS

CN    107061170 A     8/2017
GB      2538984 A    12/2016
GB      2542205 A *   3/2017  ............... F03D 5/00

* cited by examiner

BLADELESS WIND TURBINE

BACKGROUND

1. Field

The disclosure of the present patent application relates to wind power generation, and particularly to a bladeless wind turbine having a disk driven to reciprocate by the wind coupled to a hydraulic power amplification system that may be coupled to a crankshaft or linkage to convert reciprocating motion to rotary motion to drive the shaft of a turbine or an electrical generator.

2. Description of the Related Art

Wind turbines are used throughout the world as a way to harness renewable energy for a relatively inexpensive price. Despite their advantages, such as renewable energy, there are some disadvantages that need to be addressed. Wind turbines may kill birds, they are noisy, have high costs of construction and maintenance due to of the position of generators and gears at an elevated position, need a large area is needed to build a wind farm, and excess wind speed causes problems on mechanical and electrical components.

Wind turbines fall into two main categories, including vertical-axis and horizontal-axis wind turbines. Horizontal wind turbines include multiple large blades that extend radially outward from a central axis in a plane horizontal to the wind. When wind passes the blades, the blades cause rotation of the axis. In addition to rotator noise and bird collisions, horizontal wind turbines require mechanically complicated elements, such as a bevel gear for yawing, that must be disposed within the hub in order to handle a change in the direction of the wind. Furthermore, the blade-type generation system may have a problem in that power generation efficiency is low due to a wake between adjacent wind power generators. Moreover, the horizontal-type generation systems may have a problem in that it has many restrictions in terms of stability and the selection of a place when the wind power generator is established.

Vertical turbines may include blades that are offset from a central axis and extend substantially parallel to their axis of rotation, which is perpendicular to the wind direction. The vertical wind-type generation system is different from the horizontal type in that the bevel gear for yawing is generally not required. However, the vertical-axis wind turbine suffers from many of the same disadvantages of the horizontal-axis wind turbines.

Accordingly, many researchers have attempted to design and fabricate a bladeless wind turbine to avoid these disadvantages. Bladeless wind turbines have been conceived, but they often suffer from lack of efficiency and durability when compared to bladed wind turbines.

Thus, a bladeless wind turbine solving the aforementioned problems is desired.

SUMMARY

The bladeless wind turbine creates electrical energy using hydraulically communicating pistons. The system includes a wind disk, a small piston in fluid communication with a large piston, and a crankshaft attached to the large piston. The wind disk is used to collect wind force and transfer the force to the small piston. A hydraulic fluid system transfers the force of the small piston to a larger piston. When the wind disk and associated small piston have been forced to the end of their stroke by the wind, a gate in the disk is opened to reduce wind force on the disk by allowing air to travel through the disk. Due to less wind force as a result of the open gate, the disk and associated small piston are pushed back to the beginning of the stroke by the pressure created by the large piston's weight (potential energy of large piston). This process is repeated by closing the gate in the disk. The large piston is attached to a crankshaft, which turns the linear movement of the large piston into rotational movement, which is applied to an electric power generator.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The bladeless wind turbine creates electrical energy using hydraulically communicating pistons. The system includes a wind disk, a small piston in fluid communication with a large piston, and a crankshaft attached to the large piston. The wind disk is used to collect wind force and transfer the force to the small piston. A hydraulic fluid system transfers the force of the small piston to a larger piston. When the wind disk and associated small piston have been forced to the end of their stroke by the wind, a gate in the disk is opened to reduce wind force on the disk by allowing air to travel through the disk. Due to less wind force as a result of the open gate, the disk and associated small piston are pushed back to the beginning of the stroke by the pressure created by the large piston's weight (potential energy of large piston). This process is repeated by closing the gate in the disk. The large piston is attached to a crankshaft, which turns the linear movement of the large piston into rotational movement, which is applied to an electric power generator.

Figure 1:
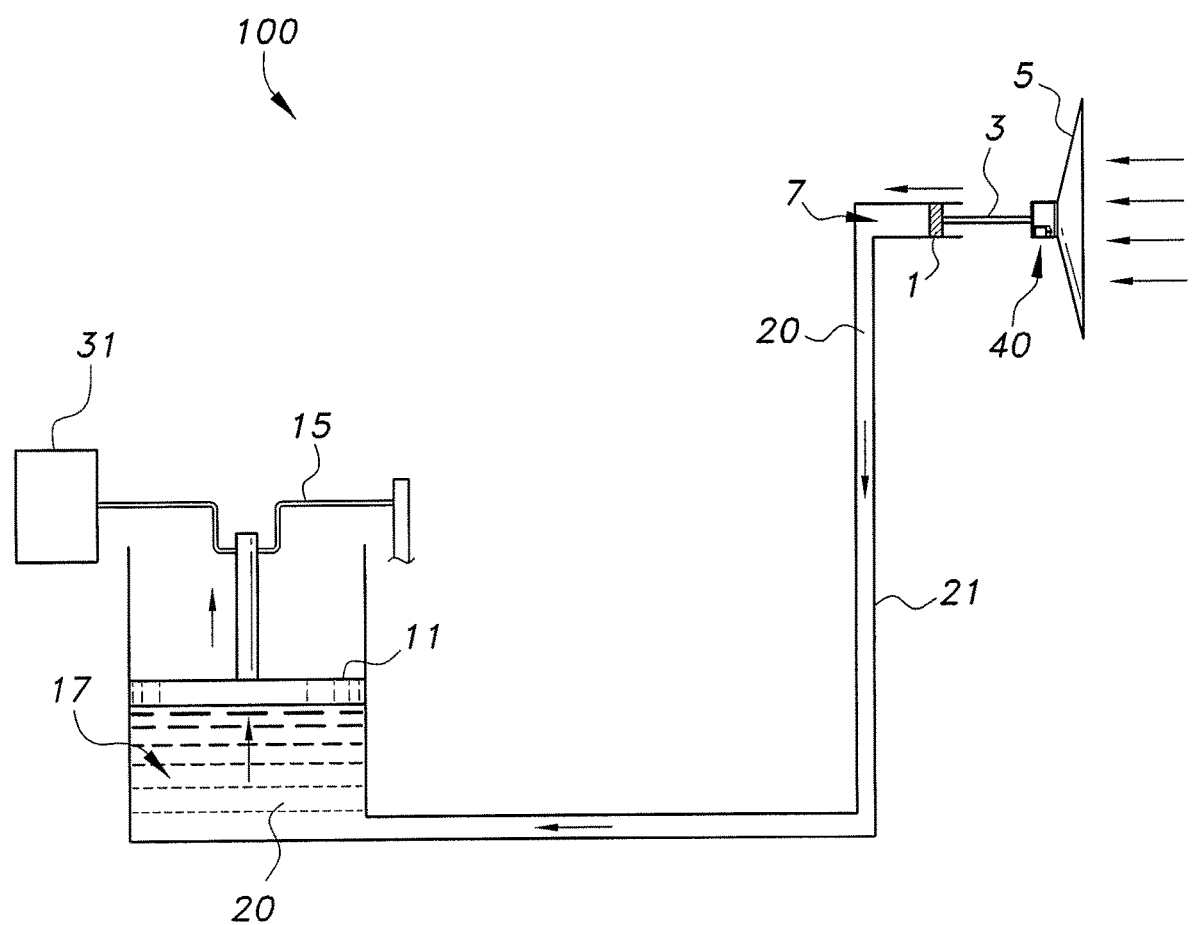
FIG. 1 is a diagrammatic side view of a bladeless wind turbine at the beginning of the forward stroke of the wind-driven piston.

FIG. 1 shows the bladeless wind turbine 100 at the beginning of a forward stroke of the wind-driven piston 1 and shaft 3. A stroke is defined as the complete range of motion of a piston. At the beginning of the forward stroke, the small piston 1 is at an outer end of a small cylindrical bore 7. In this position, the bore 7 is filled with hydraulic fluid 20 that is in communication with the large piston 11 through a conduit 21 that fills a reservoir in which the large piston is seated.

The disk 5 is attached to the small wind-driven piston 1 through an elongate shaft 3 having a length greater than that of the small piston stroke and a diameter less than that of the small piston bore 7. When a wind force $F_w$ great enough to move the small piston 1 is applied to the disk 5, the small piston 1 is pushed through the bore 7 until it reaches the end of the stroke. A fluid tight seal is created between the small piston 1 and the small piston bore 7. Therefore, by moving through the stroke, the small piston 1 pushes the hydraulic fluid out of the small piston bore 7. The movement of either piston 1, 11 from the beginning of the forward stroke to the end of the forward stroke will be referred to as the first half-cycle.

The small piston bore 7 is in fluid communication with a vertically oriented reservoir 17 through a conduit 21. The large piston 11 is seated in the reservoir 17 with a fluid tight seal between the large piston 11 and the wall of the reservoir 17. Therefore, pushing the fluid out of the small piston bore 7 results in fluid being pushed into the reservoir 17, and the large piston 11 being raised or moving upward to gain potential energy, and also rotate the crankshaft 15.

Figure 2:
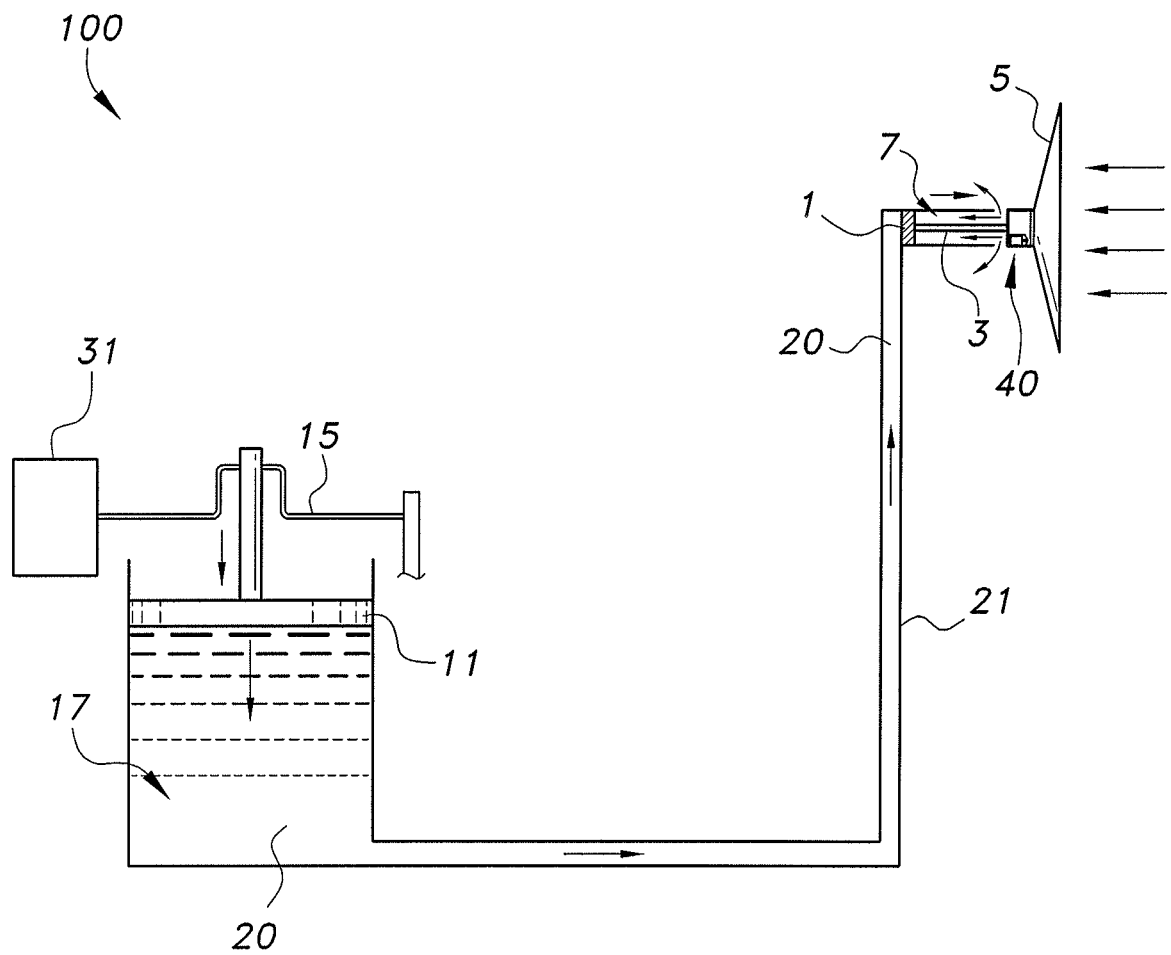
FIG. 2 is a diagrammatic side view of the bladeless wind turbine of FIG. 1 at the end of the forward stroke of the wind-driven piston.

Once the small piston 1, and simultaneously the large piston 11, have been pushed to the end of their foreword strokes, a gate mechanism 40 in the disk 5 is opened, which allows wind to flow through the disk 5 and be vented to the atmosphere in the gap between the rear of the disk 5 and the small piston bore 7. FIG. 2 shows the pistons 1, 11 at the ends of their strokes. By allowing wind to flow through the disk 5, instead of pushing against the disk 5, the wind force $F_w$ on the disk 5 and applied to the small piston 1 is reduced. This will allow the potential energy of the large piston 11 to push down the hydraulic fluid 20 in the reservoir 17 and back through the conduit 21 to bear against the small piston 1, thus pushing the small piston 1 back in the bore 7 to the beginning of the forward stroke so the process may be repeated. The movement of either piston 1, 11 from the end of the forward stroke to the beginning of the forward stroke will be referred to as the second half-cycle.

The movement of the pistons 1, 11 is based on Pascal's law. Pascal's law states that for an incompressible fluid, a change in pressure anywhere in the fluid is transmitted throughout the fluid such that the change occurs everywhere. Therefore, the force on the fluid 20 from the small piston 1 causes the fluid pressure to increase. The increase in fluid pressure then causes the large piston 11 to move. The same principle applies in the opposite direction when the weight of the piston 11 bears against the fluid 20 in the reservoir 17. A hydraulic fluid will be used as the fluid that transmits the pressure and can be considered substantially incompressible. High quality hydraulic fluids, which are more difficult to compress, will result in a more efficient device, since less energy will be wasted on compressing the fluid 20. Pascal's law can be described in the following equation (1):

$$\frac{f_1}{A_1} = \frac{f_2}{A_2} \quad (1)$$

where f=force acting on the piston and A=cross-sectional area contacting the fluid. Accordingly, a small force enacted on the small piston 1 will translate to a large force on the large piston 11 at the magnification of large piston area/small piston area. However, a distance moved by the pistons 1, 11 will have an inverse relationship. A large distance moved by the small piston 1 will cause the large piston 11 to move a short distance. Factors that can affect the piston size relationship include the force created by the wind $F_w$ (determined by disk size and wind speed), the stroke length of the pistons 1, 11, and the force required to drive the generator 31. In addition, the weight of the large piston 11 will have to be properly calibrated to provide just enough force on the small piston 1 to push it back to the beginning of the stroke. Efficiency of the system can be increased by optimizing the large piston's weight so wind force is not wasted pushing up unnecessary large piston weight.

The ratio of the piston sizes 1, 11 can be determined based on the two forces acting on the system 100. The variable force is wind force $F_w$, which is applied to the small piston 1. This force varies because it is based on wind speed, which is an uncontrolled variable. Wind force $F_w$ can be calculated using the following equation (2):

$$F_w = 0.5 * \rho * v^2 * A * C_d \quad (2)$$

where $F_w$ is wind force in Newtons, A is surface area in meters squared, $\rho$ is air density in kg/m$^3$, v is wind speed in meters per second, and $C_d$ is a drag coefficient having a value between 1 and 2. The controlled variable is the force caused by the size and weight of the large piston 11. This variable is determined based on the amount of power intended to be extracted, which will be determined based on the predicted wind force.

The cycle frequency of a system 100 will be a variable of wind force $F_w$, but can be optimized by adjusting the piston size ratio and the weight of the large piston 11. Increasing the weight of the large piston 11, decreasing the area of the large piston 11, or increasing the area of the small piston 1 will slow down the first half-cycle, since a larger wind force $F_w$ will be required to push up the large piston 11. However, these adjustments will increase the speed of the second half-cycle, since the force created by the large piston 11 to reset the small piston 1 to the beginning of the forward stroke will be larger. The opposite will happen by increasing the area of the large piston 11, decreasing the weight of the large piston 11, and decreasing the area of the small piston 1, which will allow for optimization of the system based on the predicted wind force $F_w$. However, wind force $F_w$ is an uncontrolled variable, and the system can only be optimized for a predicted average wind speed.

The cycle frequency of the bladeless wind turbine 100 can also be adjusted through use of the gate mechanism. In cases where the wind speed is at the predicted average or below, the gate mechanism 40 can be left completely closed to maximize the force of the wind on the disk 5. A wind speed above the predicted average may cause the turbine to operate at a frequency higher than intended, which may result in damage. In these high wind speed cases, the gate mechanism 40 may be partially opened during the first half-cycle to reduce the wind force acting on the turbine, thus reducing the cycle frequency. The size of the opening created by the gate mechanism 40 can be increased for increased wind speeds to keep the wind force and associated reciprocating frequency constant.

Figure 3:
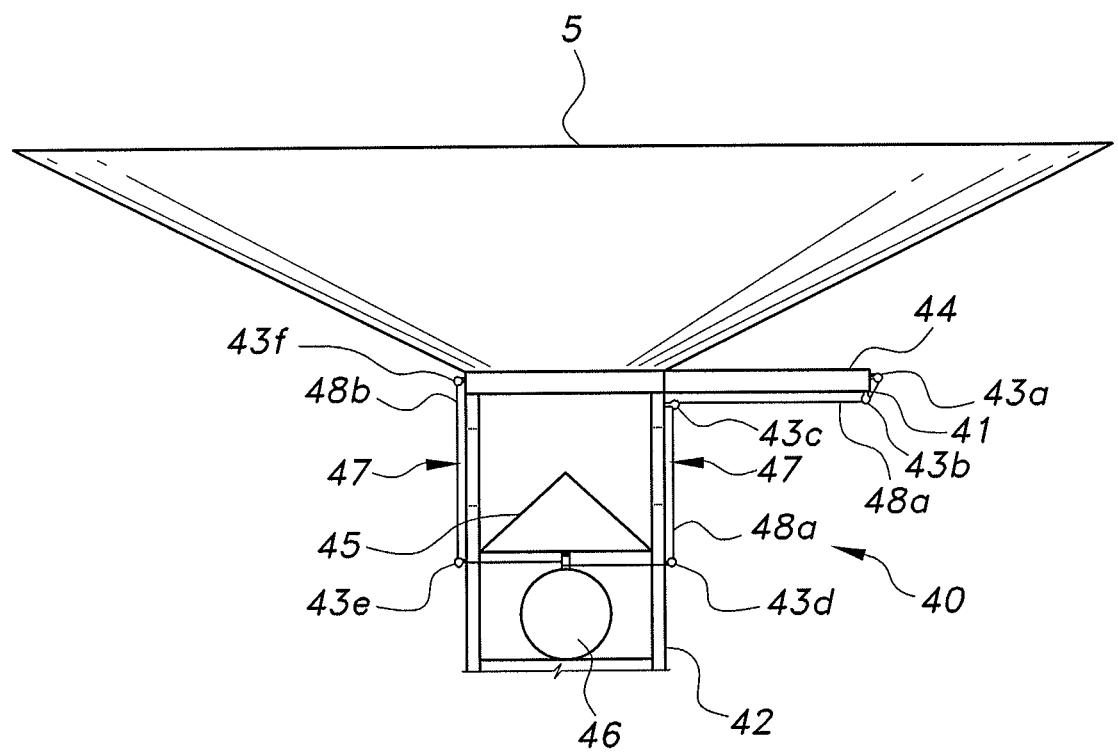
FIG. 3 is a diagrammatic top view of the wind disk and gate mechanism of the bladeless wind turbine of FIG. 1.

FIG. 3 shows a diagrammatic top view of the disk 5 and associated gate mechanism 40. The gate mechanism 40 includes a housing 42, a sliding door 44, a motor 46, and a wire linkage 48a, 48b between the motor 46 and the sliding door 44. The sliding door 44 is attached to the front of the housing 42, which is mounted on the back of the disk 5 at its center. When the gate mechanism 40 is in the closed position, which occurs during the first half-cycle, the sliding door 44 will be positioned in the center of the disk 5 and will allow minimal or no wind to pass through the opening 49 in the center of the disk 5. Therefore, the wind force acting on the disk 5 will be maximized. When the small piston 1 reaches the end of its forward stroke, the gate mechanism 40 is opened by sliding the door 44 out of the housing 42, as seen in FIG. 3. This creates an opening (not shown in the figure) in the center of the disk 5 for wind to pass through, thus reducing the wind force on the disk 5. Thus, the gate mechanism operates as a valve. Openings 47 in the side of the housing 42 allow wind to pass through the housing 42, while applying only minimal force to the first piston 1. A cone 45 may be placed in the back of the housing 42 to direct the wind out of the openings in the housing and help prevent turbulent flow.

A small motor 46, located in the back of the housing 42, moves the sliding door 44 from the open to the closed position using wires 48a, 48b and pulleys 43a-43d. As seen in FIG. 3, an extension member 41 having the length of the door 44 extends out from the side of the housing 42 in the direction that the door 44 slides. A wire 48a attached to the door 44 at one end and to the motor 46 at the other end is fed through four pulleys 43a, 43b, 43c, and 43d to guide the wire 48a between the two. The first pulley 43a is at the end of the extension member 41, which provides a location removed from the housing 42 that can be used to pull out the door 44. Pulley 43b is close to the pulley 43a to guide the wire 48a at the corner of the extension member 41. Pulleys 43c and 43d are provided to guide the wire 48a around the corners of the housing 42. A second wire 48b extends away from the motor 46 in the opposite direction and is wound around the motor 46 output shaft in a direction opposite the first wire 48a. The second wire 48b extends through pulleys 43e and 44f and connects to the door 44 at the end opposite the first wire 48a. The second wire 48b extends through a pulley 43f connected to the housing 42 adjacent the leading edge of the door 44 when it is sealed shut. This pulley 43f provides a point from which the door 44 can be pulled closed. Therefore, when the motor 46 turns in a first direction it will reel in the first wire 48a and let out the second wire 48b to open the door. When the motor 46 is turned in the opposite direction, the second wire 48b will be reeled in and the first wire 48a will be let out to close the door. Alternatively, there may be two motors, one for opening and one for closing, with one attached to each wire. In other embodiments, connection between the door and motor may be through a track and gear, or any method known in the art for sliding a door open and closed using an electric motor.

Figure 4:
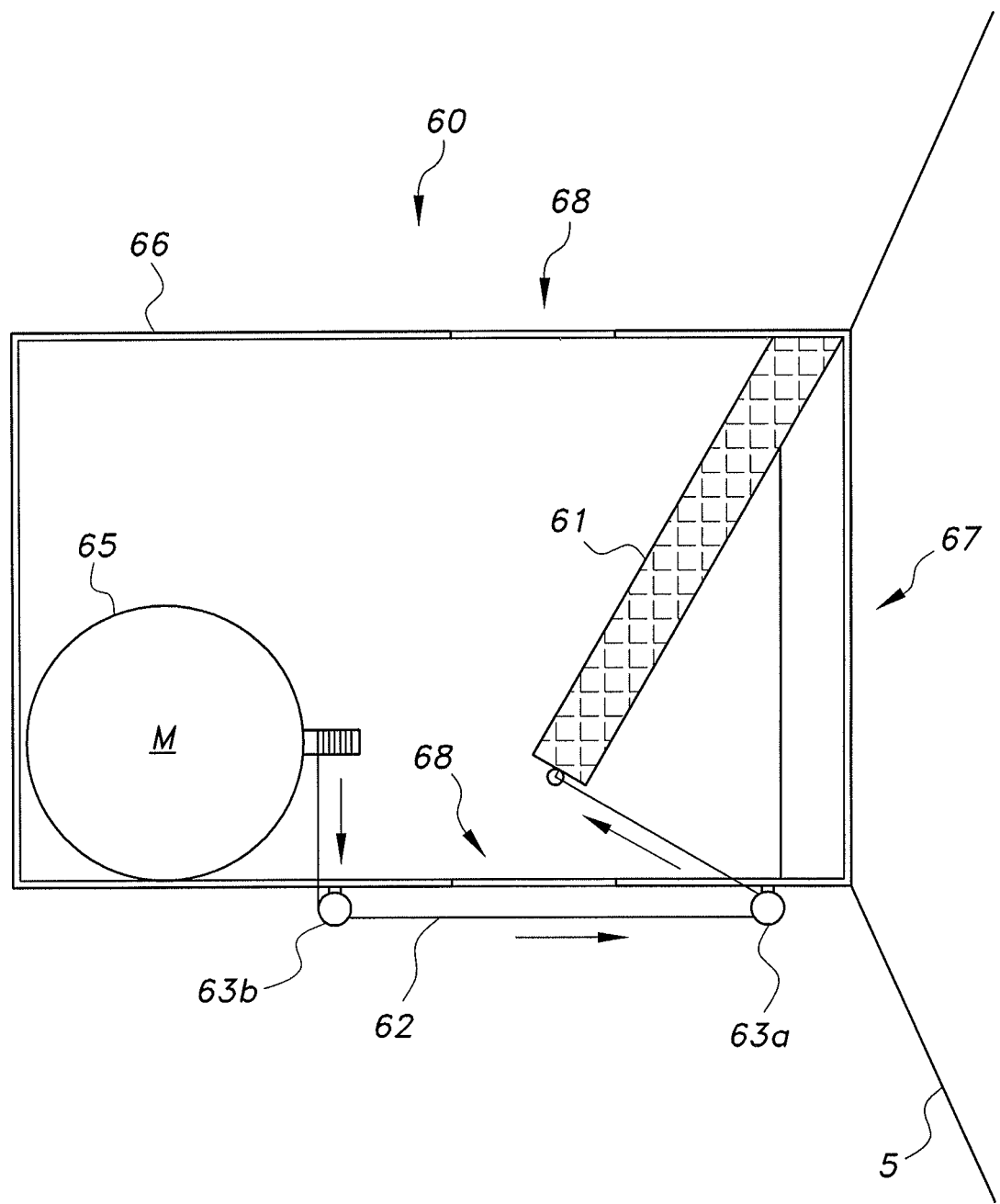
FIG. 4 is a diagrammatic top view of the wind disk and an alternate embodiment of a gate mechanism.

FIG. 4 shows a diagrammatic top view of the disk 5 and an alternate embodiment of a gate mechanism 60. The gate mechanism 60 includes a housing 66, a pivoting door 61, a motor 65, and a linkage belt 62 between the motor 65 and the pivoting door 61. One edge of pivoting door 61 is attached to the front of the housing 66 by a hinge. When the gate mechanism 60 is in the closed position, which occurs during the first half-cycle, the pivoting door 61 will be covering the opening 67 in the center of the disk 5, and will allow minimal or no wind to pass through the opening 67. Therefore, the wind force acting on the disk 5 will be maximized. When the small piston 1 reaches the end of its forward stroke, the gate mechanism 60 is opened by pivoting the door 61 into the housing 66, as seen in FIG. 4. This allows airflow through opening 67 in the center of the disk 5, thus reducing the wind force on the disk 5. Thus, the gate mechanism operates as a valve. Openings 68 in the side of the housing 66 allow wind to pass through the housing 66, while applying only minimal force to the first piston 1.

A linkage belt 62 is attached at one end to the end of the door 61 opposite the hinge, and at the opposing end to the output shaft of the motor 65. A first pulley 63a is mounted adjacent the opening 67 and provides a point from which the door can be pulled closed. A second pulley 63b guides the belt back to the motor and then transverse to the output shaft for winding and unwinding. The gate 61 is opened using the force of the wind. During the opening process, the linkage belt 62 is unwound from the output shaft of the motor 65. To close the gate 61, the motor 65 rotates to reel in the belt 62, which, in turn, pulls the gate 61 shut. A latch near the first pulley 63a or a brake on the output shaft of the motor 65 can be used to lock the gate 61 in a closed position to minimize energy expenditure of the motor 65.

Figure 5:
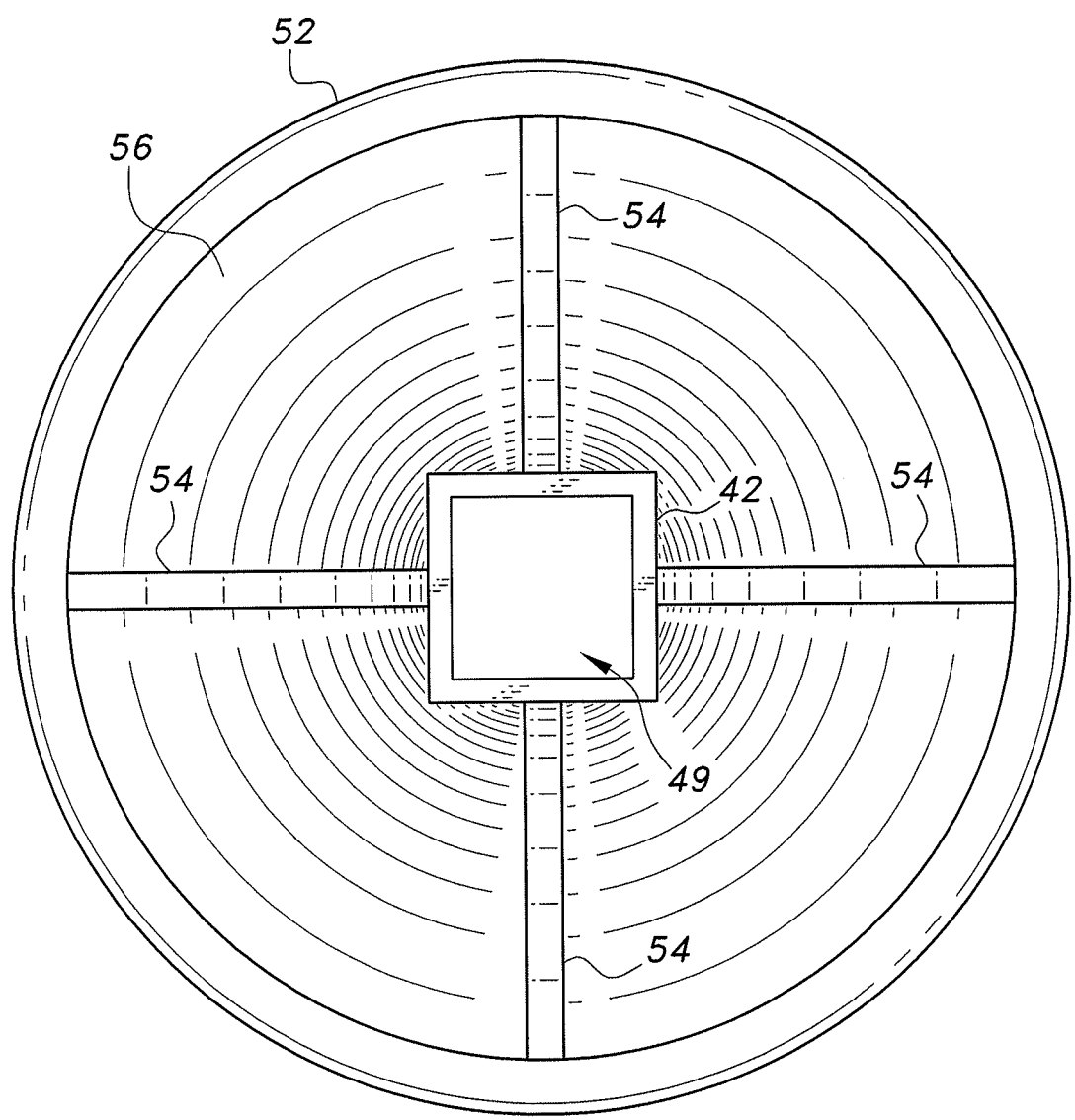
FIG. 5 is a diagrammatic front view of the wind disk of the bladeless wind turbine of FIG. 1.
Figure 6:
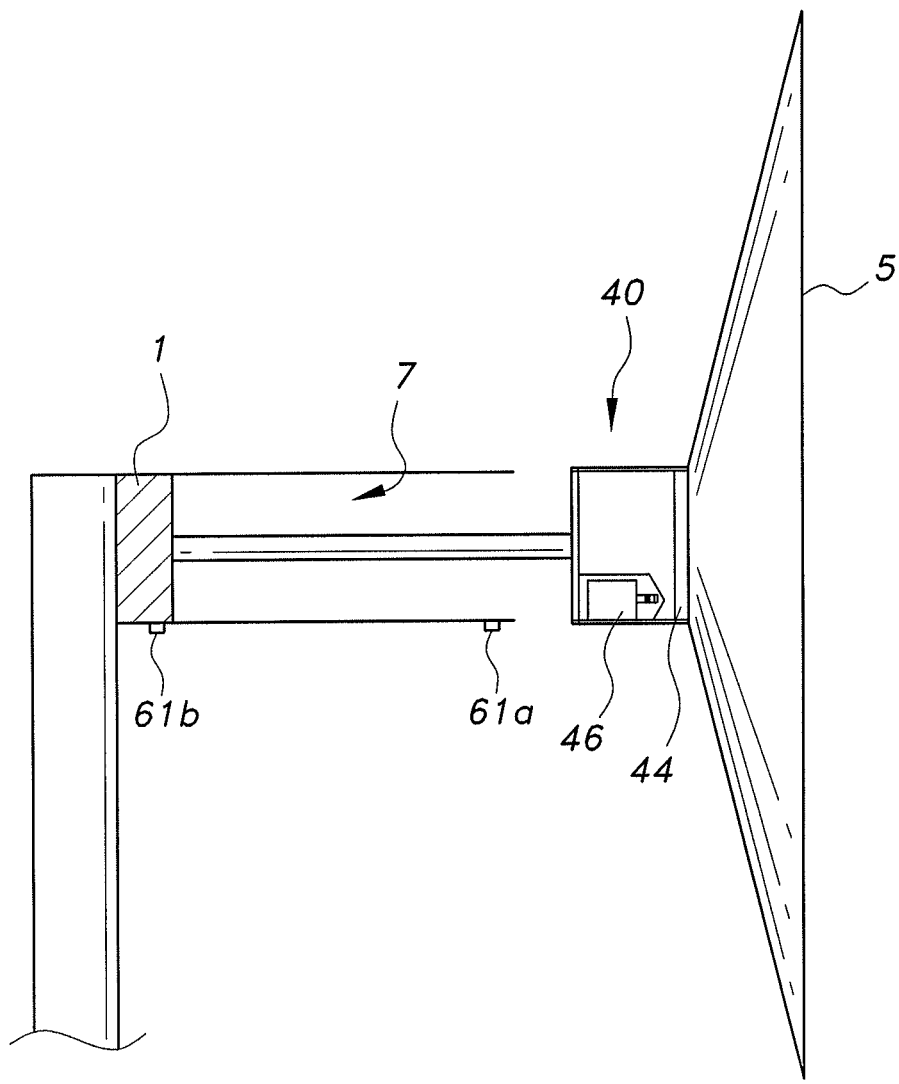
FIG. 6 is a partial view of the bladeless wind turbine of FIG. 1, largely schematic, showing details of the wind disk and wind-driven piston.

FIG. 5 shows a front view of the wind disk 5. The structure of the disk 5 is provided by an outer metallic ring 52 connected to the gate mechanism housing 42 by radial members 54. A sail material 56 is attached to the outer ring 52 and radial members 54 to create a surface for collecting the wind force. Accordingly, an air-tight seal may be created between the outer ring 52, the radial members 54, and the gate mechanism housing 42 by the sail material 56. The sail material 56 may be selected based on strength and weight. In a preferred embodiment, the sail material 56 will be of a minimal weight while retaining enough strength to prevent breakage due to wind forces. In addition, the sail material 56 will have high tear and adhesion strength, high resistance to a large range of temperatures, and high durability. Exemplary sail material 56 includes aluminum, steel, PVC coated fabrics, and tensile tent fabrics. The horizontal cross-section of the disk 5 may be shaped as a triangle, as shown in FIGS. 3 and 6, being a truncated cone having a recessed pocket for better containment of wind forces. Alternatively, the rear edges creating the recess may have an arcuate shape. In some embodiments, the disk 5 may be shaped as a truncated hollow prism. The opening 49 created by the gate mechanism housing 42 is shown as having a square cross section. However, it may also be shaped as a rectangle, circle, ellipse, or other open shapes, depending on the use scenario.

FIG. 6 shows a diagrammatic side view of the wind disk 5, small piston 1, and small piston bore 7 when at the end of its forward stroke. Accordingly, the small piston 1 is completely inserted into the bore 7, leaving the bore 7 devoid of fluid. At this point, the motor 46 will open the door 44 of the gate mechanism 40 so that the small piston 1 can return to the beginning of its forward stroke. The motor 46 may be controlled by a series of proximity sensors 61 and a controller that detect the small piston's position in its bore 7. A first sensor 61a may be located at the opening of the bore 7, or at any position that can detect that the small piston 1 is at the opening of the bore 7, causing the controller to operate the motor 46 in a direction that closes the gate mechanism door 44. A second sensor 46b, located in the bore 7 at the end of the small piston's forward stroke, or at a position that can determine when the small piston 1 is at the end of its stroke, can tell the controller to operate the motor 46 in a direction that opens the door. Alternatively, the sensors may be placed on the output piston or crankshaft to determine when the gate mechanism door may be opened or closed. A position sensor may be used in place of the proximity sensors 61a, 61b. When using a position sensor, opening and closing of the gate mechanism door 44 can be based on preset positions. The controller may also be used to leave the gate mechanism door 44 open at times no energy is needed to prevent unnecessary forces on the bladeless wind turbine 100. In addition, the controller may operate a brake that freezes the small piston 1 and associated disk 5 in place to prevent unnecessary wear when no power is needed. The ends of the small piston's bore 7 may each have a flange that prevents the piston from extending outside of the bore 7. The controller may be integrated with the motor 46.

A method of bladeless wind power generation includes: moving a first piston 1 in a first direction along a linear path by harnessing wind force using a sail 5; transferring the movement of the first piston 1 to a second piston 11 through a fluid conduit 21; wherein the second piston 11 rotates a crank shaft 180° when the first piston 1 moves a full stroke in the first direction; opening a gate 40 in the sail 5 to reduce the wind force and allow the first piston 1 to move in a second, opposite direction due to a force caused by the weight of the second piston 11 on the fluid conduit 21, wherein the second piston 11 rotates a crank shaft 15 180° when the first piston 1 moves a full stroke in the second direction thus completing 360° of rotation; and repeating the previous steps to created continuous rotation of the crankshaft 15.

The bladeless wind turbine may be termed a hybrid aerodynamic-hydraulic wind power generator.

It is to be understood that the bladeless wind turbine is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A bladeless wind power generator, comprising:
    a sealed hydraulic system having an input cylinder, an output cylinder, and a conduit extending between the input cylinder and the output cylinder;
    an input piston constrained to reciprocate in and sealing the input cylinder, the input piston having an input shaft extending therefrom out of the input cylinder;
    an output piston constrained to reciprocate in and sealing the output cylinder, the output piston having an output shaft extending therefrom out of the output cylinder;
    hydraulic fluid disposed between the input piston and the output piston;
    a wind collector attached to the input shaft, the wind collector having a relief valve switchable between a closed position in which full wind pressure is exerted against the input shaft and an open position in which at least some of the wind pressure is bled to outside atmosphere; and
    a sensor control system connected to the valve for switching the relief valve between the open and closed positions in response to sensor signals relating to position of at least one of the pistons to maintain reciprocation of the pistons;
    wherein wind pressure against the wind collector is converted to mechanical power by reciprocation of the output shaft of the output piston;
    wherein said wind collector comprises a frustoconical wind disk having a base;
    wherein the base of said frustoconical wind disk has an open window defined therein, said valve comprising a gate linearly slidable between a position completely covering and closing the open window, defining the closed position of said valve, and a position leaving the open window at least partial uncovered for passage of wind therethrough, defining the open position of said valve.

2. The bladeless wind power generator according to claim 1, further comprising:
    a linear-to-rotary actuator connected to the output shaft; and
    an electrical generator connected to the linear-to-rotary actuator, whereby reciprocation of the output shaft is converted to electrical energy.

3. The bladeless wind power generator according to claim 2, wherein said linear-to-rotary actuator comprises a crankshaft.

4. The bladeless wind power generator according to claim 1, wherein said output piston has a greater surface area than said input piston.

5. The bladeless wind turbine according to claim 1, further comprising:
    a motor disposed in the base of the wind disk, the motor having a controller;
    a linkage between the motor and the gate; and
    position sensors disposed on the horizontally oriented bore adjacent the rest position and the retracted position, the controller actuating the motor to slide the gate between the open position in response to signals from the position sensors.

* * * * *